Figure 1:
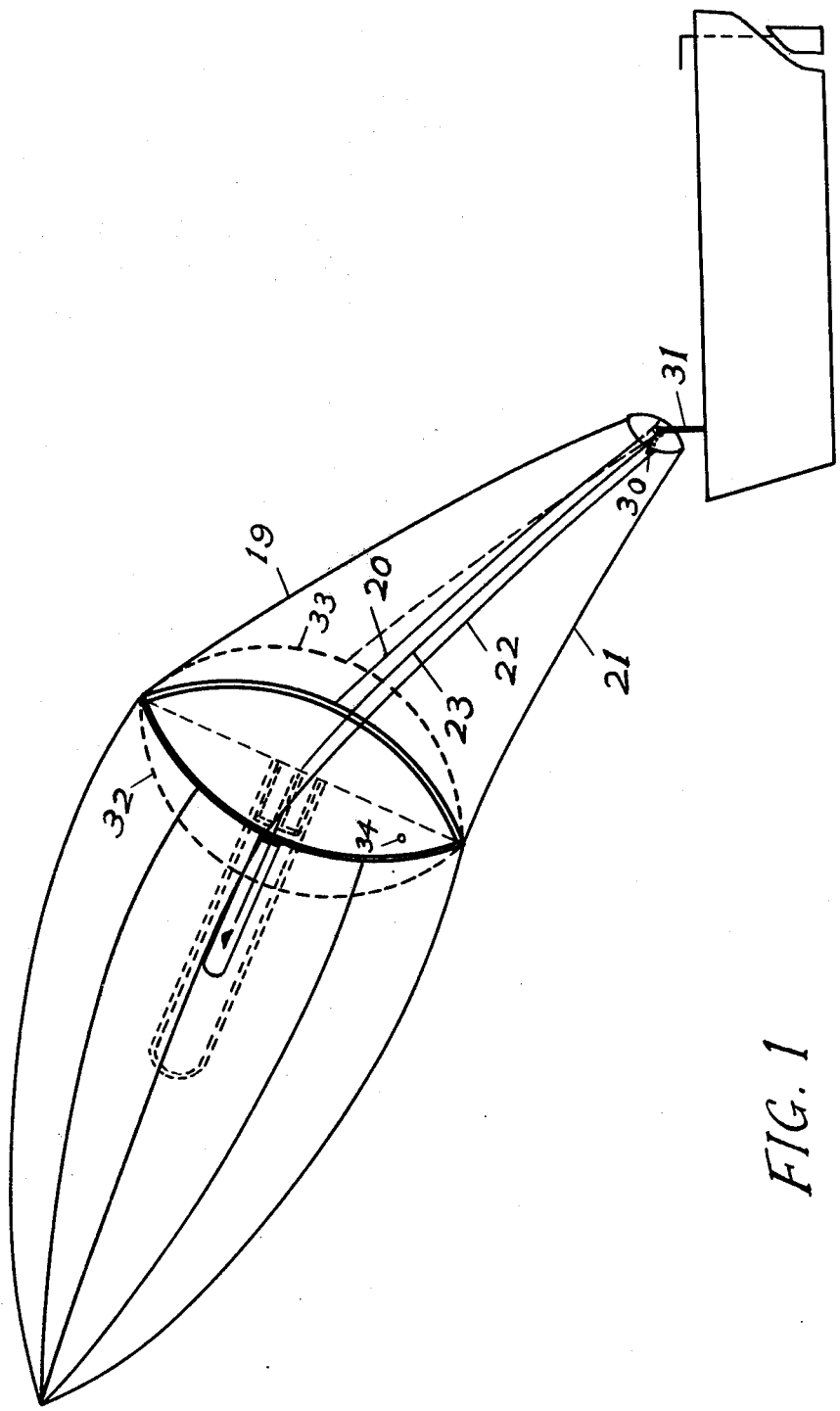

United States Patent [19]

Shyu

[11] 4,178,867

[45] Dec. 18, 1979

[54] RESCUE SIGNAL DEVICE

[75] Inventor: Ji Y. Shyu, Kaohsiung, Taiwan

[73] Assignee: Yin-Lung Yang, Kangshan, Taiwan; a part interest

[21] Appl. No.: 870,817

[22] Filed: Jan. 19, 1978

[51] Int. Cl.$^2$ ............................................. B64B 1/50
[52] U.S. Cl. ...................................... 114/39; 244/33; 9/14; 116/210
[58] Field of Search ...................... 244/33; 340/366 R; 116/124 B; 114/39, 102, 103; 9/9, 14

[56] References Cited

U.S. PATENT DOCUMENTS

| | | | |
|---|---|---|---|
| 1,933,414 | 3/1935 | Respess | 244/33 |
| 2,398,744 | 4/1946 | Jalbert | 244/33 |
| 2,512,423 | 6/1950 | Penna | 340/366 R |
| 2,629,115 | 2/1953 | Hansen | 244/33 |
| 3,592,157 | 7/1971 | Schwartz | 116/124 B |
| 3,721,983 | 6/1970 | Sherer | 116/124 B |

Primary Examiner—Trygve M. Blix
Assistant Examiner—D. W. Keen

[57] ABSTRACT

A rescue signal device of this invention can be used on a life boat and on other objects for rescue, here more concerned about the use on a life boat. The device consists of a signal balloon which can float in the air high above the boat or object when the balloon is inflated with hydrogen in an emergency. The balloon used on a life boat is made of foldable, semi-transparent, red color and air proof material in cone shape having one end flat like a cut football. A circular board serving as a sail is attached to the flat end of the balloon. The balloon is linked to the life boat by several cables tied to the periphery of the circular board. Wind force acting on the face of the circular board gives power to sail the boat for saving the refugee's physical strength. The circular board can change the angle of attack of the wind by operating the cables to co-operate with rudder for proper heading of the boat. A tubular signal-light installed in the balloon together with red color of the balloon give durable signals for attention.

4 Claims, 7 Drawing Figures

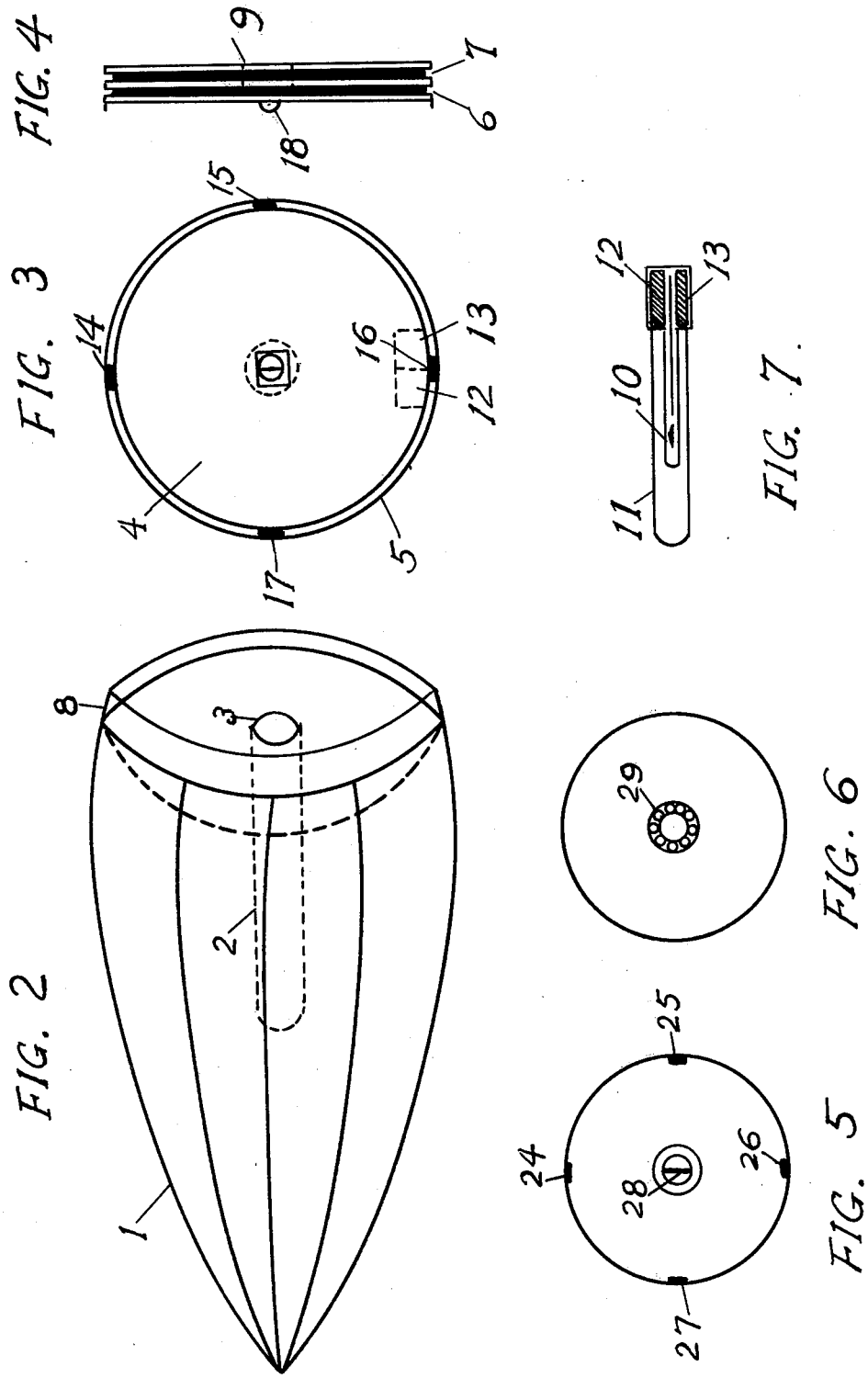

RESCUE SIGNAL DEVICE

BACKGROUND OF THE INVENTION

In general, a life boat is too small to carry enough rescue signal equipment, therefore signals are often insufficient and weak.

Conventional life boats and their rescue signals are low and often hidden by waves and can hardly be seen.

Moreover, life boats are too small to equip with an engine and no mast is available for sails, the boats can only be sailed by using the manpower of the refugees aboard, therefore, it will be futile when the refugees physical strength has been exhausted.

It is an object of this invention to provide a signal balloon which can float in the air high above a life boat when said balloon is inflated with hydrogen in an emergency. A built-in tubular signal-light and the red colour of the balloon give durable signals for attention from afar during the day or night, thusly offering more chances to be rescued.

Another object of this invention is to provide a circular board at one end of the balloon for receiving the wind as a power source for sailing the life boat. Said circular board is controllable by cables by changing the angle of attack of the wind like a conventional sail. Consequently, said signal balloon is not only used as a rescue signal indicator, but also used as a power source for sailing the boat.

Another object of this invention is to provide a same signal balloon with signal-light within said balloon for mountain climbing rescue or for amusement purposes. In which:

FIG. I is a side view of an assembly of a life boat and its rescue signal device.

FIG. II is a side perspective view of the signal balloon.

FIG. III is an elevation view of a circular board.

FIG. IV is a side view of the circular board.

FIG. V is a front view of a follow-up wheel.

FIG. VI is a back side view of the follow-up wheel.

FIG. VII is a side view of a tubular signal-light with its battery and protector installed.

As shown in FIG. II the signal balloon 1 is made of foldable, semi-transparent air-proof material in cone shape with one end flat, just like a cut football, except that there is a tubular isolator 2 of the same material located at the center axis of said balloon, said tubular isolator being hermetically sealed and the end 3 opened to a circular board of said balloon for receiving a tubular signal-light FIG. VII. A circular board 4 (FIG. III) is made of thicker material than the balloon having a circular frame 5 with double grooves 6 and 7 at its periphery (see FIG. IV). Said grooves can be matched with skirt 8 of said balloon by two strong rubber rings. A hollowed screw socket 9 is fixed at the center of said circular board for mounting the tubular signallight 10 and its housing 11, said signal light and its housing therefore protrudes into the tubular isolator 2 when assembled. Batteries 12, 13 for signal-light may be mounted within the socket 9 or at the bottom of the balloon (dotted line). Four fastening rings 14, 15, 16, 17 are formed diagonally on the circular frame of the circular board while one fastening ring 18 is formed at the center socket for connecting cables 19, 20, 21, 22, 23 respectively (see FIG. I). A follow-up wheel (FIG. V & VI) having same number of fastening rings 24, 25, 26, 27, 28 are provided for connecting the other ends of said cables respectively. A ball bearing 29 at the center of said follow-up wheel is provided for mounting freely on a shaft 30 of a post 31 at the head of the life boat (see FIG. I), thus, any twist of the cables by wind force will turn the follow-up wheel to avoid cables from twisting.

To shorten either one of the cables 20 or 22 will change the angle of attack of the wind on the circular board, just like controlling a sail.

Cable 23 which is connected at the center face of the circular board can be loosed or tighted to move said board inward (dotted line 32) or outward (dotted line 33), see FIG. I, for increasing or decreasing the wind pressure. Furthermore, such an arrangement will prevent the cables from being snapped by a strong wind.

A hydrogen bottle must be ready and available aboard the life boat for inflation of the said signal balloon during an emergency. A filling plug 34 in the balloon must be removed for filling with hydrogen and then reinstalled.

The ratio for "on" or "off" of the signal-light is 1:15, that is, signal-light will go "on" for one second at every 15 seconds intervals, let us call it rescue signal "151".

I claim:

1. A rescue signal device used for a lifeboat and other objects comprising an inflatable balloon in cone shape with one end flat like a cut football, a circular board made of thicker material than the balloon, having a circular frame secured to a circular skirt at the flat end of the balloon, said circular board being linked to the boat or object by four cables which are fastened equally apart to the circular frame of the circular board, the other end of the cables being fastened to a follow-up wheel on the boat or other object in the same manner as to the circular board, said wheel and cables changing the angle of attack of said board relative to the wind, thus operating the board as a sail to co-operate with the rudder of the boat to achieve a desired heading.

2. A rescue signal device according to claim 1 in which, a cable being secured at the center of said circular board, said board can therefore be moved outward or inward from the interior of the balloon by shortening or lengthening said cable to decrease or increase the effective area for the wind acting on the circular board to prevent cables from snapping by a strong wind.

3. A rescue signal device according to claim 1 in which, the end of said cables being fastened to follow-up wheel in the same manner as the said circular board, said wheel having a ball bearing at the center for freely mounting on a shaft of the boat, in such an arrangement any twist of the cables by wind force will turn said wheel in the same direction and to prevent cables from twisting.

4. A rescue signal device according to claim 1 in which, a signal-light, having an on and off signal at a ratio of one to fifteen seconds giving a signal of 151, is mounted in a socket at the center of the circular board and protrudes into a tubular isolator of the center axis of the balloon.

* * * * *